United States Patent [19]

Schmidt et al.

[11] Patent Number: 5,373,760
[45] Date of Patent: Dec. 20, 1994

[54] LIVE CENTER ADAPTER ASSEMBLY FOR MACHINE TOOLS

[76] Inventors: Harlan J. Schmidt, 11601 Gilpin St., Northglenn, Colo. 80233; Leon E. Schmidt, 6952 Fox Way, Denver, Colo. 80221

[21] Appl. No.: 884,713

[22] Filed: May 18, 1992

[51] Int. Cl.⁵ .................................. B23B 23/04
[52] U.S. Cl. ............................. 82/170; 142/53; 82/150
[58] Field of Search ............... 82/150, 170; 142/53

[56] References Cited

U.S. PATENT DOCUMENTS

| | | | |
|---|---|---|---|
| 1,338,451 | 4/1920 | Hoover. | |
| 1,700,837 | 2/1929 | Fisher. | |
| 2,058,322 | 10/1936 | Kline | 82/33 |
| 2,091,864 | 8/1937 | Kline | 82/33 |
| 2,124,164 | 7/1938 | Fritzsch | 82/31 |
| 2,144,490 | 1/1939 | Granberg | 82/33 |
| 2,499,131 | 2/1950 | Coles | 308/17.6 |
| 2,549,613 | 4/1951 | Lee | 82/33 |
| 2,611,174 | 9/1952 | Cote | 29/58 |
| 2,725,777 | 12/1955 | Benson | 82/33 |
| 3,316,785 | 5/1967 | Nakane | 82/150 |
| 4,828,437 | 5/1989 | Mukherjee et al. | 82/170 X |

FOREIGN PATENT DOCUMENTS

| | | | |
|---|---|---|---|
| 339460 | 8/1959 | Switzerland | 82/150 |
| 624119 | 5/1949 | United Kingdom | 83/111 |
| 865614 | 4/1961 | United Kingdom | 83/3 |
| 2048134 | 12/1980 | United Kingdom | 82/150 |
| 0221459 | 7/1968 | U.S.S.R. | 82/170 |

*Primary Examiner*—Z. R. Bilinsky
*Attorney, Agent, or Firm*—John E. Reilly

[57] ABSTRACT

A live center adapter assembly is made up of an elongated housing, a center adapter inserted into the end of the housing with a recess in the adapter having a rearwardly tapered inner wall for insertion of a center therein. Axially spaced needle bearings support the adapter and center for rotation within the housing, and a bore through one end of the housing permits insertion either of a punch for displacing the center from the adapter or a crank for the purpose of manually rotating the adapter and center.

12 Claims, 2 Drawing Sheets

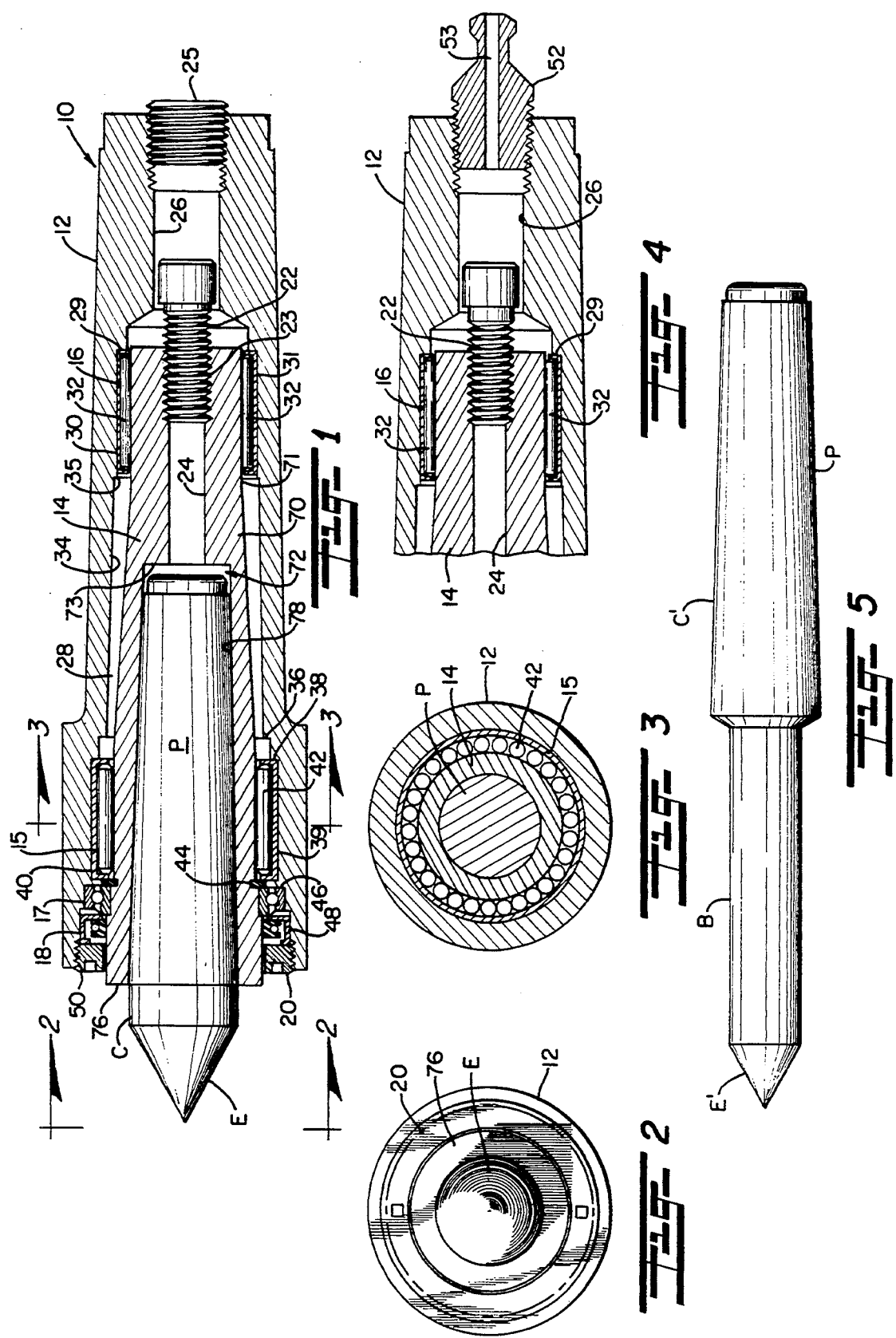

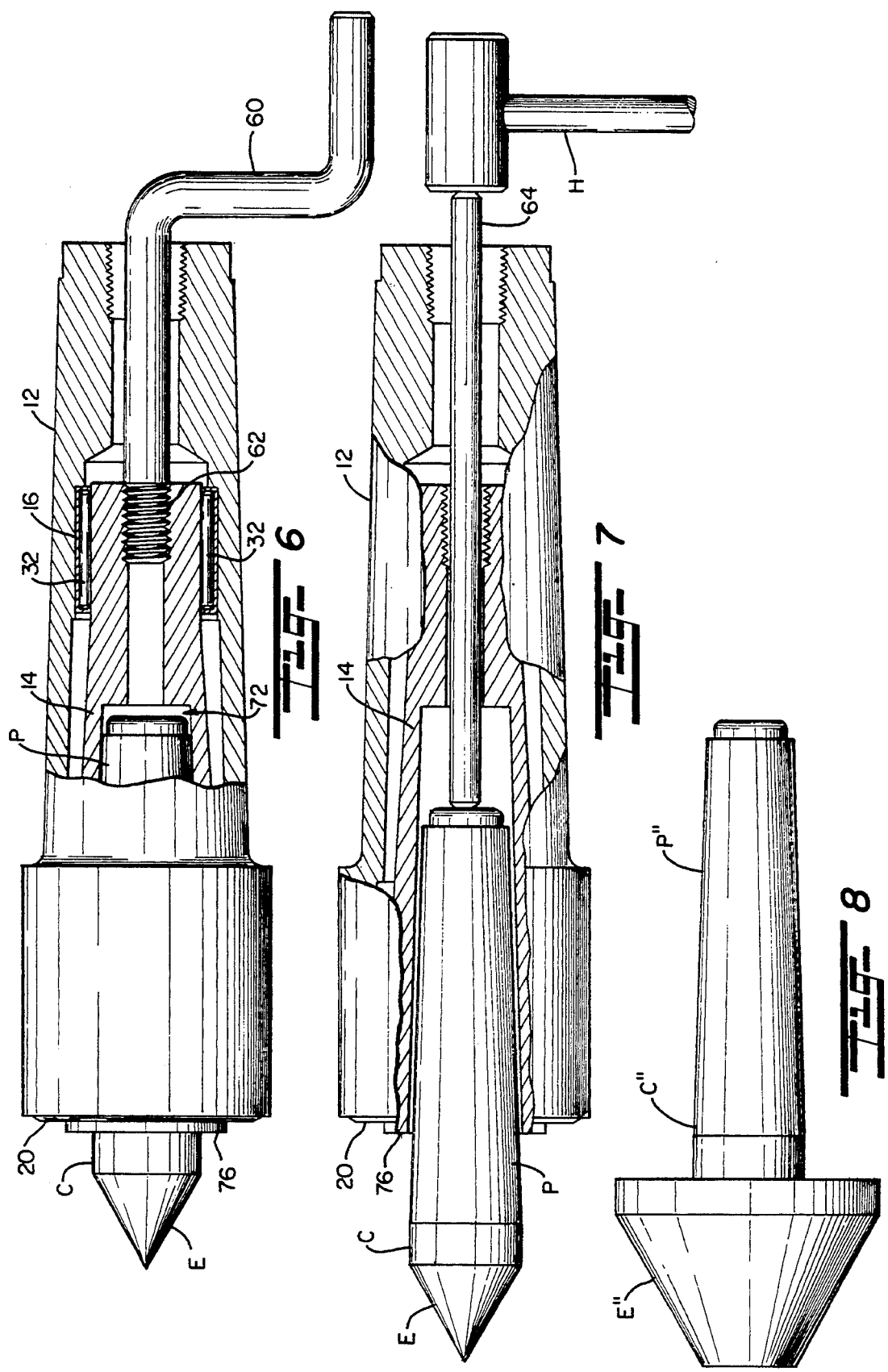

LIVE CENTER ADAPTER ASSEMBLY FOR MACHINE TOOLS

This invention relates to tailstock centering devices; and more particularly relates to a live center adapter assembly for interchangeable disposition of different sized centers into a lathe or other machine tool in a reliable and highly efficient manner.

BACKGROUND AND FIELD OF INVENTION

Tailstock centers are customarily employed on lathes and other machine tools for the purpose of supporting a work piece for rotation and in such a way as to avoid development of friction, heat or wear. Particularly under high speeds of rotation, there is an increasing demand for an adapter which will accommodate different sized centers and at the same time lend greater rigidity or support to the center in order to overcome laterally applied pressure or forces when under rotation. Moreover, there is a demand for an adapter assembly which is small enough to clear other tooling and yet provide the necessary support for rotation of different sized centers within the adapter; and in this connection to facilitate rapid substitution of centers without disassembly of the adapter as well as to permit grinding of the centers when worn without removal from the adapter assembly. In the past, the approach has been to employ either relatively bulky ball bearings or conical bearings which necessitate the use of relatively large housings and do not always offer the necessary rigidity or support against laterally applied forces or loads.

Various approaches have been taken in the past to the design and mounting of tailstock centers and, for example, U.S. Pat. Nos. 2,058,322 and 2,091,864 to J. E. Kline disclose lathe center supports which are designed to permit interchangeable disposition of different centers but do not afford spaced bearing support for the centers. U.S. Pat. No. 1,700,837 to W. R. Fisher is directed to a lathe center holder which employs sets of conical bearing members in closely spaced relation to one another and permits utilization of a punch for removal of centers from the adapter assembly.

British Pat. No. 624,119 discloses a tailstock center which includes spaced conical bearing supports which will absorb thrust as well as laterally applied forces or loads but requires a relatively large housing to accommodate the adapter assembly and center. U.S. Pat. No. 2,549,613 to J. W. Lee discloses a tailstock center in which the center itself can be engaged by a rotary drive member for the purpose of grinding centers without removal from the housing.

Other representative U.S. Patents in this field are U.S. Pat. Nos. 1,338,451 to E. M. Hoover, 2,124,164 to F. A. Fritzsch, 2,144,490 to B. R. Granberg, 2,499,131 to H. J. Coles, 2,611,174 to G. H. Cote and 2,725,777 to B. A. Benson.

SUMMARY OF INVENTION

It is therefore an object of the present invention to provide for a novel and improved centering device for machine tools and the like.

Another object of the present invention is to provide for a novel and improved tailstock centering device which is compact and capable of accommodating different sized centers with minimum time required for the removal and substitution of centers; and further wherein the centering device is capable of rigidly supporting each center in position against laterally applied forces.

It is a still further object of the present invention to provide for a new and useful tailstock centering device which is extremely compact and efficient to use; further wherein an adapter assembly is provided which facilitates lubrication, removal and grinding of centers with a minimum of downtime required.

It is an additional object of the present invention to provide an improved centering device of the type described which incorporates a novel and improved bearing support and end retainer to reduce the size of the assembly and to offer greater stability and resistance against laterally applied forces; and to effectively prevent leakage of lubricant or the entrance of foreign matter into the adapter or bearing assemblies.

In accordance with the present invention, centering device has been devised for interchangeable disposition of live centers therein and which is specifically adaptable for use with lathes and other machine tools, the device comprising an elongated housing including a bore in the rear end, a center adapter inserted into an end of the housing opposite to the rear end which adapter is of elongated hollow cylindrical configuration and is provided with an axial bore at its rear end is aligned with the housing bore, and a recess at the opposite end of the adapter is provided with a rearwardly tapered inner wall conforming to the taper of the center to be inserted therein. There is also provided a retainer means between the front ends of the housing and adapter for retaining the adapter against axial movement or release from the housing, and axially spaced needle bearing means are interposed between the adapter and housing adjacent to the front ends of the adapter for rigidly supporting the center while permitting free rotation of the adapter and center with respect to the housing.

In the preferred form, the retainer means effectively absorbs any thrust or axially directed forces applied to the adapter while preventing leakage of lubrication from the assembly. A threaded stem at the rear end of the adapter assembly prevents leakage of any grease or lubricant into the interior of the adapter and can be removed so as to permit a punch to be inserted through the adapter to dislodge the center from engaged relation to the adapter; and, in the alternative, a manual crank may be inserted into threaded engagement with the rear end of the adapter so that the adapter and attached center can be manually rotated for grinding of the center when worn.

The above and other objects, advantages and features of the present invention will become more readily appreciated from a consideration of the following detailed description of a preferred embodiment thereof, when taken together with the accompanying drawings, in which:

BRIEF DESCRIPTION OF THE DRAWINGS

FIG. 1 is a cross-sectional view of a preferred form of live center adapter assembly in accordance with the present invention;

FIG. 2 is a view taken about lines 2—2 of FIG. 1;

FIG. 3 is cross-sectional view taken about lines 3—3 of FIG. 1;

FIG. 4 is a fragmentary view of a portion of the assembly shown in FIG. 1 with the attachment of a grease fitting at one end;

FIG. 5 is a front view in elevation of a modified form of center to be inserted into the adapter assembly of FIG. 1;

FIG. 6 is a front view partially in section of the preferred form of adapter assembly with a crank inserted into the rear end of the adapter assembly for manual rotation of the adapter assembly and attached center;

FIG. 7 is a front view partially in section of the preferred form of adapter assembly illustrating the insertion of a punch through the rear end of the housing and adapter assembly to facilitate removal of a center therefrom; and FIG. 8 is a front view of another form of center which can be releasably inserted into the adapter assembly of the present invention.

DETAILED DESCRIPTION OF THE PREFERRED EMBODIMENT

Referring in detail to the drawings, there is illustrated in FIGS. 1 to 4 a preferred form of live center adapter assembly or centering device 10 for a conventional center designated at C and wherein the assembly 10 is broadly comprised of an outer elongated housing 12 of hollow, generally cylindrical configuration for insertion of an adapter 14 through one open end of the housing; and the adapter is rotationally supported by axially spaced bearing members including a front needle bearing assembly 15 and a rear needle bearing assembly 16. The adapter 14 is similarly of elongated, generally cylindrical configuration and is held in place within the housing by a retainer assembly consisting of a ball bearing 17, grease seal 18 and nut 20. A threaded stem member 22 is threadedly engageable with an interior threaded portion 23 at a rearward end of bore 24 in the adapter 14, and a plug 25 is threadedly inserted into an interior threaded end of housing bore 26 at the rearward end of the housing 12.

Considering in more detail the construction of the housing 12, a cavity 28 is formed throughout the greater length of the housing and which is in communication with the bore 26, the cavity including a shoulder portion 29 at the rearward end of an axially extending wall surface 30 in which the outer race 31 of the bearing member 16 is seated and which race 31 houses a series of needle bearings 32. An inner wall 34 tapers forwardly from a shoulder 35 at the forward edge of the wall 30 and terminates in a shoulder 36. Another shoulder 38 is located forwardly of the shoulder 36 and is at the rearward end of an axial wall portion 39, the wall surface portion 39 receiving outer race 40 of the front bearing member 15. Again, a series of needle bearings 42, as best seen from FIG. 3, are retained within the outer bearing 40, and it will be understood that the needle bearings 32 on the rear bearing member 16 are correspondingly arranged within the outer race 31 but are of reduced size with respect to the front bearing member 15 and its associated needle bearings 42. A snap ring 44 is disposed in a groove in the external surface of the adapter 14 to bear against the front end of the outer race 40 of the bearing member 15 and to securely retain the bearing member 15 against axial shifting or movement once positioned within the housing.

Referring to the retainer assembly, the ball bearing member 17 is firmly seated against a shoulder 46 just forwardly of the bearing member 15 and the grease seal 18 is securely retained in position adjacent to the forward end of the bearing 17 by a seal housing 48. The retainer assembly at the forward or leading end of the housing 12 is completed by the nut member 20 which is externally threaded for engagement with internal threading 50 at the front end of the housing cavity 28. One suitable form of seal is the CR Oil Seal Model No. 13510 manufactured and sold by CR Services of Elgin, Ill. One suitable form of bearing assembly is the "FAFNIR" Model 542D0-FS428 manufactured and sold by The Torrington Company of Torrington, Conn.

The adapter 14 includes a relatively thick-walled portion 70 at its rear end in surrounding relation to the bore 24 and is provided with a straight cylindrical wall surface 71 which is disposed in spaced parallel relation to the inner wall surface 30 for firm seating of the needle bearing 16 therebetween. An elongated tapered recess 72 extends from the front end for the greater length of the adapter and terminates in a shoulder 73 at the entrance to the bore 24. The adapter 14 diverges forwardly from the rear end to define a relatively thin-walled portion 76 in surrounding relation to the recess 72 and to define a rearwardly tapered inner wall surface 78 which is matched to the taper of the center C to be inserted therein. In addition, the wall portion 76 includes a bearing support surface 80 which is parallel to the outer bearing support surface 39 in the housing in order to receive the front needle bearing assembly 15 and which bearing assembly 15 is captured between the shoulder 38 and the snap ring 44 directly behind the retainer assembly.

FIG. 4 illustrates a grease fitting 52 inserted into the housing bore 26 in place of the plug 25. In this way, grease can be injected through the center aperture 53 of the fitting 52, and the stem 22 remains in place in order to isolate the center C from contact with the grease.

As illustrated in FIGS. 1 and 4, a conventional center as designated at C has a rearwardly tapered end portion P and a front conical end E. The taper of the end portion P dictates the degree of taper along the inner wall surface of the recess 72 which extends the greater length of the adapter 14 and communicates with the bore 24. In this way, firm frictional engagement is established between the end portion P and inner wall of the recess 72 throughout its substantial length.

A modified center C' is shown in FIG. 5 and has a tapered wall portion P' which corresponds to the end portion P of FIG. 4. In this version, the center C' includes a cylindrical extension B which terminates in a conical end portion E'. In turn, FIG. 8 illustrates another modified form of center C" having a wall surface portion P" and an enlarged conical end E". The centers C, C' and C" are merely representative of different centers that can be accommodated by the adapter assembly 10 of the present invention. Moreover, the adapter assembly can be matched to different tapers along the wall surface, such as, a No. 1, 2 or 3 Morris taper which are standard tapers for tailstock but nevertheless will effect firm frictional engagement with the inner wall of the recess 72.

In order to further illustrate the versatility of the adapter assembly 10, FIG. 6 illustrates the removal of the plug 25 and stem 22 so that a crank 60 having a threaded end 62 is engageable with the interior threaded portion 23 of the adapter 14. The crank 60 serves as a rotary drive member which can be manually rotated with the center C remaining in place for the purpose of grinding the end E of the center C when it becomes worn. FIG. 7 illustrates the insertion of a rod or punch 64 through the aligned bores 24 and 26 of the adapter 14 and housing 12, respectively. The punch 64 has one end abutting the rearward end of the center C with the opposite end of the rod extending through the rearward end of the housing so that it is exposed for engagement by a hammer H.

It is therefore to be understood that while a preferred form of invention has been set forth and described herein, various modifications and changes may be made without departing from the spirit and scope of the present invention as defined by the appended claims and reasonable equivalents thereof.

We claim:

1. A centering device for interchangeable disposition of live centers in a tailstock comprising:
   an elongated housing including a housing bore at a rear end thereof;
   a center adapter inserted into a front end of said housing opposite to said rear end, said adapter being of elongated hollow cylindrical configuration and provided with an axial bore at its rear end aligned with said housing bore, and a recess at a front end of said adapter provided with a rearwardly tapered, generally conical wall conforming to the taper of a live center to be inserted therein;
   retainer means between said front end of said housing and said front end of said adapter for retaining said adapter against axial movement with respect to said housing; and
   axially spaced bearing means interposed between said adapter and said housing said adapter including an interior threaded portion at one end of said bore nearest to said housing bore, and a threaded stem member engageable with said interior threaded portion and defining an extension of said adapter through said housing bore for supporting said adapter for rotation within said housing.

2. A centering device according to claim 1, said bearing means including axially directed first and second needle bearings extending parallel to a longitudinal axis through said housing and said adapter.

3. A centering device according to claim 1, said retainer means including a nut threadedly engageable with an interior threaded portion at said front end of said housing.

4. A centering device according to claim 3, said retainer means including a grease seal located between said nut and said front bearing means.

5. A centering device according to claim 4, said retainer means including a bearing member interposed between said grease seal and said first needle bearing means.

6. A centering device according to claim 1, said interior threaded portion disposed at one end of said bore nearest said housing bore, and a rotary drive member including a threaded end portion engageable with said interior threaded portion for rotation of said adapter.

7. A centering device according to claim 6, said rotary drive member being in the form of a manual crank member.

8. A centering device for interchangeable disposition of live centers in a tailstock comprising:
   an elongated generally cylindrical housing including a housing bore at a rear end thereof and a grease fitting inserted into said housing bore;
   a center adapter inserted into a front end of said housing opposite to said rear end, said adapter being of elongated hollow cylindrical configuration and provided with an axial bore at its rear end aligned with said housing bore, interior threading at one end of said bore nearest to said housing bore and a recess at a front end of said adapter provided with a rearwardly tapered, inner generally conical wall surface conforming to the taper of a live center to be inserted therein;
   a rotary drive member including a threaded end portion engageable with said interior threaded portion for rotation of said adapter, said rotary drive member being in the form of a manual crank member;
   retainer means between said front end of said housing and said front end of said adapter for retaining said adapter against axial movement with respect to said housing; and
   axially spaced needle bearing means interposed between said adapter and said housing having needle bearings adjacent to said front and rear ends, respectively, of said adapter for supporting said adapter for rotation within said housing.

9. A centering device according to claim 8, said needle bearings each defining axially directed needle bearings extending parallel to a longitudinal axis through said housing and adapter.

10. A centering device according to claim 8, said retainer means including a nut threadedly engageable with an interior threaded portion at said front end of said housing, a grease seal located between said nut and said front bearing means, and a ball bearing member interposed between said grease seal and said front bearing means.

11. A centering device according to claim 8, said adapter including a threaded stem member engageable with said interior threading and defining an extension of said adapter through said housing bore.

12. A centering device according to claim 11, said adapter including a relatively thick-walled portion in surrounding relation to said axial bore and a relatively thin-walled portion diverging forwardly from said thick-walled portion to define said generally conical wall surface.

* * * * *